United States Patent [19]
Gifford et al.

[11] 3,851,493
[45] Dec. 3, 1974

[54] GAS SEPARATION AND PURIFICATION UTILIZING TIME SEQUENCED FLOW THROUGH A PAIR OF REGENERATORS

[75] Inventors: William E. Gifford, Syracuse; Enrico D. Veltri, East Syracuse, N.Y.

[73] Assignee: General Electric Company, Syracuse, N.Y.

[22] Filed: Sept. 5, 1972

[21] Appl. No.: 286,166

[52] U.S. Cl. .................................... 62/13, 62/21
[51] Int. Cl. ............................................. F25j 5/00
[58] Field of Search .............. 62/12, 13, 14, 18, 21, 62/23

[56] References Cited
UNITED STATES PATENTS

| | | | |
|---|---|---|---|
| 2,007,271 | 7/1935 | Frankl | 61/12 |
| 2,327,133 | 8/1943 | Schuftan | 62/23 |
| 2,677,438 | 5/1954 | Reid | 61/18 |
| 2,730,875 | 1/1956 | Ranke | 62/13 |
| 2,977,771 | 4/1961 | Pearce | 62/13 |
| 3,282,062 | 11/1966 | Hudson | 62/18 |
| 3,349,570 | 10/1967 | Potts | 62/18 |
| 3,352,121 | 11/1967 | Biskis | 62/18 |
| 3,514,396 | 5/1970 | Fischer | 62/18 |

*Primary Examiner*—Norman Yudkoff
*Assistant Examiner*—F. Sever
*Attorney, Agent, or Firm*—Carl W. Baker; Frank L. Neuhauser

[57] ABSTRACT

The gas separation processes and apparatus disclosed employ reversing flow type thermal regenerators for removal or recovery of relatively higher saturation temperature constituents from such mixtures of gases as carbon dioxide in air. The starting gas mixture is passed through a pre-cooled thermal regenerator to condense out the higher saturation temperature constituent of the mixture within the regenerator at a location which migrates toward the regenerator cold end as inflow continues and the regenerator temperature rises. After this pass through the regenerator the gas is cooled and then passed in reverse direction through the same or another similarly cycled regenerator so as to remove the previously deposited condensable gas constituent by vaporization into the outflow. The distribution of the condensable gas in the outflow stream is concentrated in the initial part of the stream, with substantially all of the condensable constituent vaporized into and exhausted with the first 10 to 25% of the outflow. The outflow accordingly can be divided into two time sequential portions the first of which will have a relatively very high concentration of the condensable gas and the second a relatively very low concentration thereof, and the two portions thus divided may be transmitted to separate points of use or discard. The process characteristics are complementary to those of other gas separation devices such as chemical scrubbers or absorption systems, so the process lends itself well to combination with them to yield high overall system efficiency.

9 Claims, 5 Drawing Figures

GAS SEPARATION AND PURIFICATION UTILIZING TIME SEQUENCED FLOW THROUGH A PAIR OF REGENERATORS

BACKGROUND OF THE INVENTION

The present invention relates generally to processes and apparatus for gas separation, and more particularly to a process and apparatus employing reversing flow type thermal regenerators for separating a relatively high saturation temperature constituent from a gas mixture.

Thermal regenerators have in recent years come into wide and successful use in refrigeration and gas separation systems for a variety of applications. In the gas separation systems of interest here the thermal regenerators commonly used comprise a matrix of material of high specific heat through which the gas is passed sequentially in reverse directions. During the first or inflow pass, heat transfers from the relatively warmer gas to the matrix material, then, with the direction of flow reversed, heat transfers from the warmed matrix to the cold gas. Any condensable constituents in the inflow gas freeze out on the regenerator matrix and thus are deposited within the regenerator during inflow. In conventional systems the outflow gas is of greater volume and lower pressure than the inflow gas and therefore has the capacity to evaporate and remove the deposits completely during the outflow cycle.

It is the usual practice in these gas separation systems to use a gas other than the product gas itself for condensate removal from the regenerators during the outflow cycle, the scavenging gas used being any which may be conveniently and economically available such as air or nitrogen. It has also been proposed to use a part of the product gas for condensate removal, as described for example in U.S. Pat. No. 3,091,093 to Becker. In the Becker system the pressurized gas after inflow through one regenerator is split and one part passed back through each of two other regenerators in one of which the outflow gas serves to scavenge the condensate from the regenerator, through a process described as requiring essentially isothermal operation of the regenerators.

The present invention is directed to processes and apparatus of the kind in which condensate removal is accomplished by the same gas as passed through the regenerator during the inflow phase, but which otherwise differs from the foregoing and other similar processes in both practice and result. In accordance with the invention, the process variables are controlled so as to accomplish substantially complete condensate removal within a first and relatively small part of the outflow phase. This permits the outflow to be divided into two time sequential portions the first of which contains substantially all the condensate and the second relatively very little. The apparatus necessary to the performance of this process is relatively simple and the process is characterized by relatively high efficiency, so the invention may be practiced with relatively low equipment cost and with good operating economy. Also, the operating characteristics are such that the process may be combined to good advantage with other processes yielding still better efficiencies for the overall combination.

SUMMARY OF THE INVENTION

In carrying out the process of the invention, a starting gas mixture including at least one constituent gas having a saturation temperature which is relatively high as compared to that of the other gas or gases of the mixture, is passed through a thermal regenerator from the warm end to the cold end thereof, the regenerator having been previously cooled either in the course of an earlier cycle or otherwise. The gas pressure and temperature levels are such that the mixture is cooled below the dew point of the condensable gas constituent thereby causing at least a susbstantial part of it to condense out and deposit in the regenerator. The thermal capacity of the regenerator preferably is no more than several times that of the gas processed during each cycle, and as consequence there is a substantial swing of regenerator temperature during the inflow and outflow phases. During inflow this temperature shift causes a migration of the deposited condensate progressively along the length of the regenerator.

The cooled gas after passage through the regenerator is further cooled by a heat exchanger or refrigerator, and is passed as outflow through another regenerator in which condensate was deposited in the preceding cycle. The outflowing gas vaporizes this previously deposited condensate into the gas stream, in a concentration which is substantially higher than in the starting gas mixture but which drops to substantially lower level as the condensate deposits are removed. The outflow from the regenerator therefore may be divided into two separate time sequential portions, with the first including substantially all the condensable gas and the second including little if any thereof. The process may thus be used either to remove impurity gases having relatively high saturation temperatures from gas mixtures including them, or may be used to concontrate a high saturation temperature gas in a mixture of which it is one constituent.

The process functions must efficiently where the concentration of the high saturation temperature gas is relatively low, hence it lends itself well to combination with such other known gas separation techniques as chemical scrubbers and absorption columns which function most effectively at high concentration levels of the gas to be separated.

BRIEF DESCRIPTION OF THE DRAWING

The foregoing and other attributes, features and advantages of the invention will become more fully apparent and the invention further understood by reference to the following detailed description when read in conjunction with the accompanying drawings, wherein.

DESCRIPTION OF THE PREFERRED EMBODIMENT

Figure 1:
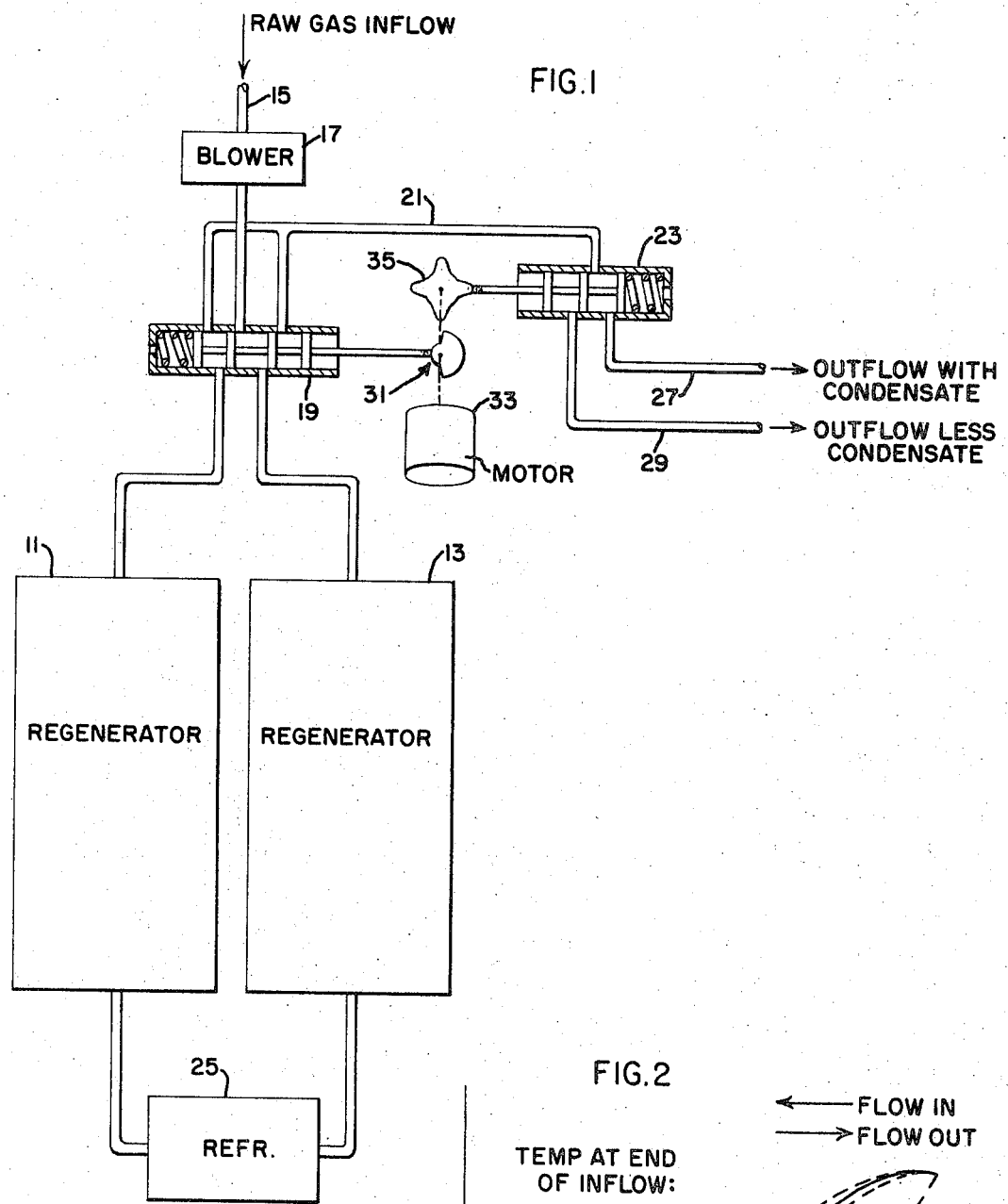
FIG. 1 diagrammatically illustrates a preferred embodiment of apparatus suitable for practice of the process of this invention.

With continued reference to the drawings, FIG. 1 illustrates one elemental embodiment of apparatus for gas separation and purification in accordance with the invention. The apparatus as shown comprises two regenerators 11 and 13 which may be of conventional construction. These regenerators preferably are small relative to the amounts of gas to be processed by them, so that the regenerator temperatures will cycle through a relatively large temperature swing in the course of system operation as hereinafter explained. The regenerators also are preferably of high thermal efficiency, so that thermal and vapor pressure equilibrium may be quickly achieved and consistently maintained between the regenerator matrix material and the gas being processed, along the full length of the regenerator.

The raw gas input to the system, through conduit 15, may be pressurized as by blower 17 to a degree sufficient to maintain the desired rate of gas flow through the system; the process cycle does not require any compression or expansion of the gas, however, so no compressor or vacuum pump is required and a simple fan or flower is sufficient. The inflow gas is routed by a reversing valve 19 which in the interests of simplicity is shown as a conventional spool valve, to one or the other of the two generators, to regenerator 13 when the spool valve spindle occupies the position shown. When in this position valve 19 serves too to connect the outflow line from the other regenerator 11 through conduit 21 to a second valve 23 also shown as a spool valve.

Refrigeration means 23 is connected between the two regenerators as shown, and provides the cooling step necessary to gas separation in accordance with the invention. This refrigeration means may comprise any suitable mechanical refrigeration means, or alternatively may comprise a heat exchanger with liquid air, nitrogen or other liquefied gas as the coolant medium. This refrigeration means is selected to have capacity and low temperature capability such that all gas passed therethrough has its temperature lowered to a point well below the saturation temperature of the constituent to be separated, preferably at least 100°K below such saturation temperature.

In operation of the regenerators 11 and 13 in the system as thus far described, the feed gas mixture at relatively warm temperature, which conveniently may be room temperature, is directed by valve 19 into regenerator 13 on its warm side and the gas is cooled by exchange of energy with the regenerator matrix material in the form of heat. Upon exiting from regenerator 13, the gas is further cooled by passage through the refrigeration means 25, then enters regenerator 11 from its cold side and again exchanges energy with the regenerator matrix material. In this case, however, the matrix material is cooled by the gas and the gas is warmed.

Figure 2:
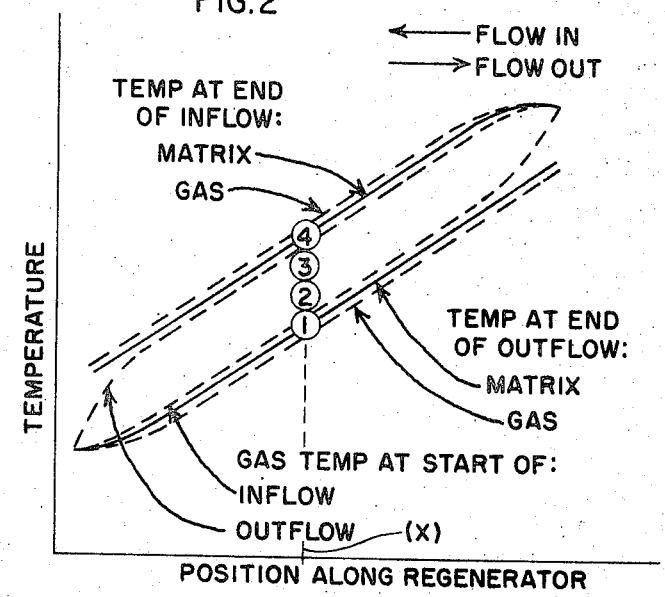
FIG. 2 illustrates representative temperature distributions within the regenerators in operation of the apparatus of FIG. 1.

Valve 19 is periodically reversed, as by the actuation means to be described, so that the respective positions of the regenerators 11 and 13 in the cycle are reversed. After repetition of this sequence a number of times each of the regenerators will develop temperature distributions which are cyclic as shown in FIG. 2. The solid lines in that figure show the matrix temperature at its extremes, the lower of the two solid lines representing matrix temperature at the end of the outflow, and the higher of the two solid lines at the end of the inflow. Also shown in FIG. 2 are the temperature patterns of the gas at the start and end of the inflow period, and at the beginning and end of the outflow period, these gas temperature patterns being shown as broken lines identified by appropriate legend.

In completing the description of other components of the apparatus of FIG. 1 and of the process performed thereby, it will be helpful to speak in terms of a specific illustrative example of gas mixture from which one constituent is to be removed. Because of its relationship to the habitat atmosphere maintenance system hereinafter described, a mixture of carbon dioxide in nitrogen has been selected as this example.

As will be recalled, the total pressure of a mixture of gases is substantially equal to the sum of the partial pressures of the individual constituent gases, so that for a nitrogen-carbon dioxide mixture the following relation holds:

$$P = p_{N_2} + p_{CO_2}$$

where P is the total pressure, $p_{N_2}$ is the partial pressure of nitrogen, and $p_{CO_2}$ is the partial pressure of carbon dioxide.

Because the vapor pressure curves of $N_2$ and $CO_2$ differ substantially, $CO_2$ will begin to freeze out, at a temperature corresponding to its partial pressure in the $N_2/CO_2$ mixture, much sooner than $N_2$. As the $CO_2$ freezes out the concentration of $CO_2$ in the mixture can be expressed as:

$$\text{Molar \% } CO_2 \text{ in vapor phase} = p_{v_{CO_2}} / (P)$$

where $p_{v_{CO_2}}$ = the vapor pressure of $CO_2$

Since the vapor pressure is dependent upon temperature, it can be seen from the above relationship that the concentration of $CO_2$ in the gaseous mixture will also depend upon temperature.

Figure 3:
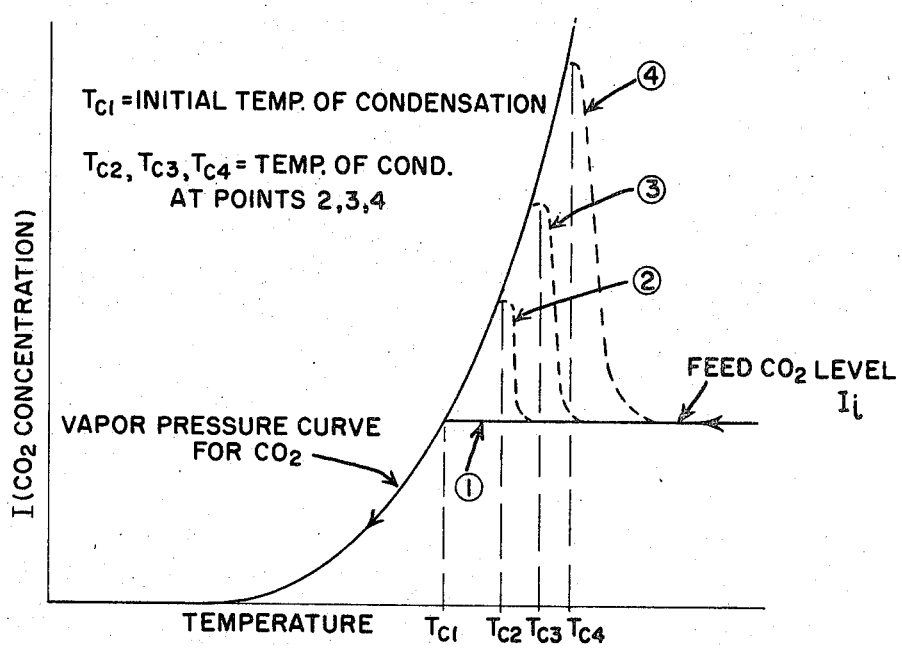
FIG. 3 illustrates the pattern of deposition of condensate within the regenerators in the apparatus of FIG. 1.

Referring again to FIG. 2, at a point (x) along the regenerator the temperature will shift from (1) to (2) to (3) to (4) during the inflow period and from (4) to (3) to (2) to (1) during the outflow period. In FIG. 3 there is shown a plot of I, the local concentration of $CO_2$, versus temperature during the inflow period. As the gas is cooled the $CO_2$ concentration I remains constant along the regenerator until the dew point or saturation temperature of $CO_2$ is reached. If the regenerator matrix has very small passages and high efficiency so that thermal and vapor pressure equilibrium is achieved everywhere, the $CO_2$ will condense out as the gas reaches the point within the regenerator at which the matrix temperature is below the $CO_2$ saturation temperature. The $CO_2$ concentration in the gas then will be reduced according to a relationship which can be derived from the Clausius-Clapeyron relation:

$$I = C_1 P_v = C_2 e^{-L/RT}$$

where

I = local concentration of $CO_2$ in the gas mixture
$P_v$ = vapor pressure of $CO_2$
L = latent heat of vaporization for $CO_2$
R = international gas constant
T = temperature
$C_1$ and $C_2$ = constants These curves typically are quite steep and reduce the $CO_2$ to a very low level at a temperature only a little under that at which it first condenses out.

As the inflow proceeds and the regenerator is warmed by the inflowing gas, the temperature of the regenerator matrix at the point at which the $CO_2$ has first condensed rises. This causes the condensed $CO_2$ there to evaporate, mixing with the incoming gas and thereby increasing locally the $CO_2$ level in the gas mixture. Thus when the regenerator temperature profile is in position (2), one-third through the inflow period, the local $CO_2$ level will have increased by evaporation of previously deposited $CO_2$ from the warmed matrix and $CO_2$ now will start to condense out at a higher temperature, $T_{c2}$, than at the start. At point (3) and (4) during the regenerator inflow period the effect becomes even greater, and ultimately $CO_2$ levels may be achieved which are many times the initial $CO_2$ level.

Figure 4:
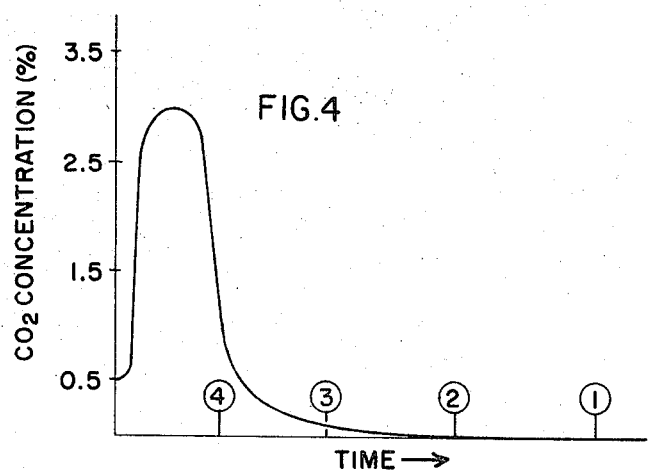
FIG. 4 illustrates a typical variation in condensate concentration in the outflow gas in the apparatus of FIG. 1.

The result of this is that the $CO_2$ deposits out within the regenerator at temperature levels therein as high as $T_{c4}$, substantially higher than the temperature $T_{c1}$ at which it initially condenses out, and as the regenerator temperature rises the $CO_2$ deposits within it migrate toward its cold end. When the exhaust flow starts, the high heat transfer efficiency of the regenerators will enable the outflow gas to come quickly into vapor pressure equilibrium with the deposited $CO_2$ condensates everywhere within the regenerator. The outflow accordingly becomes saturated with $CO_2$ up to the high level of concentration corresponding to $T_{c4}$, thus effecting rapid revaporization of the previously deposited $CO_2$. As the gas in the outflow passes beyond the $CO_2$ deposits within the regenerator the concentration remains substantially constant. This results in the I vs. Time curve shown in FIG. 4 for the initial outflow.

With this initial outflow of gas containing a substantial portion of the $CO_2$ which was deposited during the inflow, all the deposited $CO_2$ is quickly evaporated into the first portion of the outflow and later portions contain only negligible concentrations. This results in the I vs. T curve shown in FIG. 4 for (4), (3), (2) and (1) points during the thermal regenerator outflow period. Thus the final 80% or so of the outflow gas has been purified of $CO_2$ by concentrating it all into the first 20% or so. The latter exhausting gas can be almost completely freed of $CO_2$ in this way, and as can be seen the process is most effective where the initial level $I_i$ is relatively low and substantially complete removal of $CO_2$ is desired.

The point in time at which the outflow is to be divided as between its no-condensate or product portion and its condensate-containing or waste portion is determined by choice of process variables, particularly the level of residual $CO_2$ which can be permitted in the product portion. As indicated, division at a 20/80 time ratio has been determined experimentally to be suitable in the $CO_2$ air mixture described; with other gases and different process variables it is expected that appropriate time ratios would fall within the range 10/90 to 25/75. Division may be accomplished by any convenient valving mechanism such as the simple two-way spool valve 23 shown. Depending on valve position, the outflow is passed through either of two conduits 27 and 29 which pass the product and waste gases respectively to their different points of disposition.

The reversing valve 19 is operated periodically by any suitable actuation mechanism providing substantially equal dwell times in each of its two positions. By way of example, the valve 19 as shown actuated by a cam and follower 31 which may be driven by a motor 33 at a speed such that the duration and volume of gas flow through the regenerators during each cycle are appropriately scaled to the regenerator thermal capacities. Typically, for example, motor 33 would be run at a speed such as to actuate the valve 19 between its two positions once every few minutes, perhaps 1–3 minutes.

The outflow dividing valve 23 must be actuated once at the beginning and once during each outflow cycle in order to selectively route the no-condensate and condensate-containing portions of the outflow to their respective utilization points. To accomplish this in the particular embodiment illustrated, the valve 23 is shown connected through a cam follower to a second cam 35 driven by the same motor as the reversing valve actuator. The contour of cam 35, however, is doubly convoluted with respect to that of cam 31 so as to shift valve 23 between its two positions twice for each shift of reversing valve 19. Thus each outflow cycle for each of the two regenerators is divided by valve 23 into two time sequential parts, the first or condensate-containing part being directed by valve 23 to conduit 27, and the second or no-condensate part being directed to conduit 29.

Cam 35 also must be contoured appropriately to the ratio of the time periods through which these two parts are taken, to provide an appropriate time ratio such as the 20/80 ratio previously mentioned. To accomplish this the cam contour should provide a dwell time for valve 23 in the position shown which is about one-fourth of that provided when the valve is in its other position. The times of actuation of reversing valve 19 and divider valve 23 may readily be adjusted with respect to each other through adjustment of the relative angular positions of their respective cams 31 and 35 on the cam shaft driven by motor 33.

Other potentially more efficient arrangements for control of the divider valve 23 are possible. Since the ultimate purpose of this valve is to divide the no-condensate part of the outflow from the condensate containing part, the valve may be placed under control of means responsive, directly or indirectly, to the percentage of $CO_2$ in the outflow, actuating the valve each time this percentage passes through some predetermined threshold level. For direct control, a variety of sensors are known for detecting concentrations of $CO_2$ and other gases; for indirect control the valve actuator could be made responsive to gas temperature, since normally there will occur a clearly perceptible shift in the rate of temperature drop of the outflow phase regenerator at the point in time at which the deposited condensate is substantially entirely removed therefrom. Suitable sensors responsive to gas concentrations and temperatures are commercially available, and may be arranged for actuation of the divider valve 23 in straight-forward manner.

As previously noted, the gas separation process of this invention functions particularly effectively where the initial level of the high saturation temperature gas is relatively low. This characteristic enables the process of this invention to be combined advantageously with other separation processes and equipments having complementary characteristics, i.e., those which function most effectively with relatively high levels of concentration of the high saturation temperature gas constituent. For example, the chemical scrubbers widely used for $CO_2$ removal in atmosphere maintenance systems for habitats such as submarines operate most efficiently with input $CO_2$ concentrations above 1%, but $CO_2$ concentrations in the habitat air which is the input to the scrubbers normally are maintained below this 1% level and scrubber efficiency is impaired accordingly. $CO_2$ concentration levels below 1% are well within the range of efficient operation of the separator of the present invention, however, and the two separation processes can be combined to good advantage.

Figure 5:
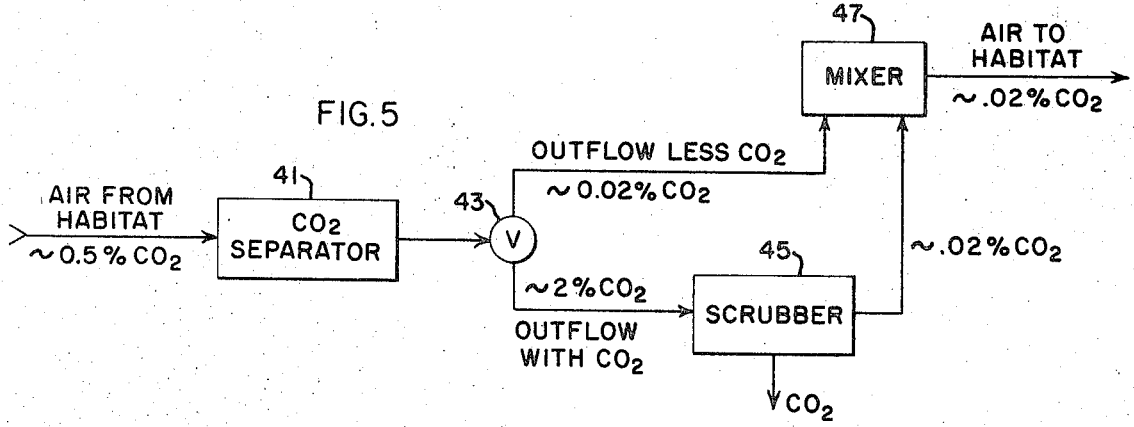
FIG. 5 is a block diagram illustrating the application of this invention to an atmosphere purification system for a habitat such as a submarine.

Such a combination is illustrated in FIG. 5, in which a $CO_2$ separator 41 in accordance with the present invention accepts air from the submarine atmosphere at about 0.5% $CO_2$. The output from separator 41 is divided by valve 43 into two time sequential parts, one being the part from which most of the $CO_2$ has been removed and in which the average residual concentration is perhaps 0.02%, and the other being the condensate-containing part in which $CO_2$ concentration may be of the order of 2%. This latter part is passed to a scrubber 45 of conventional type, which drops the $CO_2$ concentration to 0.02% or so and absorbs or otherwise removes the remaining $CO_2$ from the gas stream in conventional manner. The two flows may then be again combined in mixer 47 and the product, which would be about 0.02% $CO_2$, is returned to the habitat. This arrangement maintains the habitat $CO_2$ concentration below 0.5%, allows the scrubber to operate with a higher and thus more efficient input concentration of about 2%, and requires the scrubber to process only about 20% of the total gas flow thus greatly reducing its required capacity and cost.

As will be understood, the gas separation process of this invention may be applied either to systems for the removal of impurity or other undesired gas constituents from gas mixtures, or for the concentration and extraction of desired gas components. An example of the former has already been given; an example of the latter might be the recovery of industrial solvents from exhaust air from industrial processing areas.

The process and apparatus of the invention function well and with good efficiency in these and many other applications, particularly in view of the high thermal efficiency of the process and the absence of need for gas pressurization in performing it. Of course, while gas pressurization is not essential to the process it may in some cases be advantageous to accomplish the cooling step, which is essential to the process, by expansion rather than by refrigeration. This may be done simply by substituting suitable gas compression and expansion devices for the blower and refrigeration means hereinbefore described.

What is claimed as new and desired to be secured by Letters Patent of the United States is:

1. The process of separating from a starting gas mixture a constituent gas characterized by a saturation temperature relatively higher than other constituent gases of the mixture, comprising the steps of:
   a. passing said gas mixture through a thermal regenerator from the warm end toward the cold end thereof at pressure and temperature levels such that the gas mixture is cooled below the dew point of said high saturation temperature gas thereby causing at least a substantial part thereof to condense out and deposit in said regenerator;
   b. reducing the temperature level of the gas as passed through said regenerator;
   c. passing said gas at reduced temperature level through a thermal regenerator from the cold end toward the warm end thereof to thereby vaporize previously deposited condensate into the gas stream initially at concentrations substantially higher than in the starting gas mixture and as the condensate deposits are removed then in concentrations substantially lower than in said starting gas mixture; and
   d. dividing the regenerator outflow into separate time sequential portions of which the first includes said high saturation temperature gas in relatively high concentration and the second includes said high saturation temperature gas in substantially lower concentration, and passing said first and second time sequential portions of the regenerator outflow to separate points of use or discard.

2. A gas separation process as defined in claim 1 wherein the regenerator temperature is substantially raised by the inflow gas passing therethrough, whereby during inflow the condensate deposits continually migrate toward the cold end of the regenerator by evaporation and redeposition within the regenerator.

3. A gas separation process as defined in claim 1 wherein the division of the regenerator outflow into separate time sequential portions is accomplished under control of means responsive to time.

4. A gas separation process as defined in claim 1 wherein division of the regenerator outflow into separate time sequential portions is accomplished under control of means responsive to the concentration of said high saturation temperature gas in the regenerator outflow.

5. Apparatus for separating from a starting gas mixture a constituent gas characterized by a saturation temperature relatively higher than other constituent gases of the mixture, comprising:
   a. a source of a starting gas mixture including said constituent of relatively high saturation temperature;
   b. first and second thermal regenerators;
   c. gas cooling means connected between said first and second regenerators for passing gas after inflow through one regenerator for outflow through the other, and providing a substantial drop in temperature level of the gas as passed between said regenerators;
   d. first valve means selectively operable between a first position in which said gas mixture is constrained to flow from said source through one of said regenerators and then to outflow through the other thereof to a discharge line, and a second position in which the direction and sequence of flow through said regenerators is reversed;
   e. second valve means connected to selectively route the regenerator outflow in said discharge line to either of two points of disposition; and
   f. means responsive to a process parameter related to the concentration of said high saturation temperature gas in the regenerator outflow for actuating said second valve means and controlling in accordance therewith the selection of said point of disposition, to divide the outflow into a first portion having a high concentration of said high saturation temperature gas and a second portion having a relatively low concentration thereof.

6. Gas separation apparatus as defined in claim 5 wherein the actuation means for said second valve means comprises sensor means directly responsive to the concentration of said high saturation temperature gas in the regenerator outflow.

7. Gas separation apparatus as defined in claim 5 wherein the actuation means for said second valve means comprises time-responsive means arranged to actuate the valve after lapse of a time period proportioned to the period of relatively high concentration of said high saturation temperature gas in the regenerator outflow.

8. Gas separation apparatus as defined in claim 7 wherein said actuation means for said second valve means conjointly controls said first valve means for actuation with a time periodicity half that of said second valve means.

9. Gas separation apparatus as defined in claim 5 further comprising gas scrubber means having supplied thereto said first portion of the regenerator outflow, said scrubber being operative to reduce the level of concentration of said high saturation temperature gas therein.

* * * * *